(12) United States Patent
Gough

(10) Patent No.: US 12,311,844 B2
(45) Date of Patent: May 27, 2025

(54) EXTERIOR REAR VIEW ASSEMBLY AND VEHICLE THEREWITH

(71) Applicant: Motherson Innovations Company Limited, London (GB)

(72) Inventor: Joel James Gough, Riley, MI (US)

(73) Assignee: Motherson Innovations Company Limited, London (GB)

(*) Notice: Subject to any disclaimer, the term of this patent is extended or adjusted under 35 U.S.C. 154(b) by 344 days.

(21) Appl. No.: 17/917,317

(22) PCT Filed: Mar. 31, 2021

(86) PCT No.: PCT/EP2021/058530
§ 371 (c)(1),
(2) Date: Oct. 6, 2022

(87) PCT Pub. No.: WO2021/204635
PCT Pub. Date: Oct. 14, 2021

(65) Prior Publication Data
US 2023/0144329 A1     May 11, 2023

Related U.S. Application Data

(60) Provisional application No. 63/006,750, filed on Apr. 8, 2020.

(51) Int. Cl.
*B60R 1/07*     (2006.01)
*B60R 1/06*     (2006.01)
(Continued)

(52) U.S. Cl.
CPC .............. *B60R 1/07* (2013.01); *B60R 1/0602* (2013.01); *B60R 1/1207* (2013.01); *B60R 11/04* (2013.01);
(Continued)

(58) Field of Classification Search
CPC ....... B60R 1/07; B60R 1/0605; B60R 1/0612; B60R 1/06; B60R 1/1292; B60R 1/006; B60R 1/02
(Continued)

(56) References Cited

U.S. PATENT DOCUMENTS

| 2,447,786 A | 8/1948 | Anderson |
| 2014/0091596 A1* | 4/2014 | Maeda ................. B62K 25/283 296/192 |

(Continued)

FOREIGN PATENT DOCUMENTS

EP     1437261 A2     7/2004

OTHER PUBLICATIONS

International Search Report and Written Opinion dated Jun. 18, 2021 of International application No. PCT/EP2021/058530.

*Primary Examiner* — Dennis H Pedder
(74) *Attorney, Agent, or Firm* — Jones Day

(57) ABSTRACT

The present disclosure refers to an exterior rear view assembly for mounting to a vehicle (120) with a cowl (114), comprising: a base assembly adapted for attachment to the vehicle (120) independent of whether the vehicle (120) is provided with a vehicle door (110), wherein the base assembly is adapted for attachment to the cowl (114); and a head assembly (102) coupled to the base assembly. It also refers to a vehicle (120) with a cowl (114) and at least one such exterior rear view assembly (100).

14 Claims, 7 Drawing Sheets

(51) Int. Cl.
*B60R 1/12* (2006.01)
*B60R 11/04* (2006.01)

(52) U.S. Cl.
CPC ............... *B60R 2001/1223* (2013.01); *B60R 2001/1253* (2013.01)

(58) Field of Classification Search
USPC .... 296/192, 1.11, 203.01, 2; 248/475.1, 479
See application file for complete search history.

(56) References Cited

U.S. PATENT DOCUMENTS

| | | |
|---|---|---|
| 2014/0239143 A1 | 8/2014 | Hernandez |
| 2019/0275952 A1 | 9/2019 | Bennett |
| 2019/0283674 A1 | 9/2019 | Bennett et al. |

\* cited by examiner

EXTERIOR REAR VIEW ASSEMBLY AND VEHICLE THEREWITH

CROSS-REFERENCE TO RELATED APPLICATIONS

This application is a National Stage Entry of International Patent Application No. PCT/EP2021/058530, filed on Mar. 31, 2021, which claims the benefit of priority to U.S. Provisional Patent Application No. 63/006,750, filed on Apr. 8, 2020, each of which is hereby incorporated by reference in its entirety for all purposes The present disclosure relates to an exterior rear view assembly which provides support and integration to a vehicle cowl. It also relates to a vehicle with a cowl and at least one such exterior rear view mirror assembly.

BACKGROUND

The statements in this section merely provide background information related to the present disclosure and may not constitute prior art.

Automobiles utilize stand alone exterior rear view assemblies in form of rear view mirrors attached to the door of the vehicle to improve viewing of potential hazards. Government safety regulations require passenger cars to have an exterior and, thus, outside mirror of unit magnification. Currently, drivers cannot legally remove the doors of a vehicle and drive on government highways or roads without installing an aftermarket mirror or reconfiguring the supplied exterior mirror being a door mirror to a vehicle mounted location. Both the aftermarket and the reconfigured original vehicle mirrors take additional time for installation after removing the vehicle doors and involve basic mechanical knowledge to become compliant with government regulations. The aftermarket and the reconfigured original vehicle mirror only provides for a field of view and do not allow for additional functions to be included in the mirror assembly such as a light module for turn light, spot lights, blind spot monitor or other lighting/safety modules. These stand alone exterior mirrors also do not offer any integration with the vehicle styling which can give an unattractive appearance to the vehicle when mounted.

There is a growing trend for drivers to utilize removable vehicle doors for off road usage for a unique driving experience. Drivers wish to be compliant with government regulations without the inconvenience of having to add or reconfigure an external mirror.

For the foregoing reasons, there is a need to have an exterior rear view assembly which would be operational when the exterior doors are removed and provide functional integration for the assembly. Thus, the removal of the vehicle door shall be enabled while maintaining the original supplied rear view device with all included functionality, eliminating the need for an aftermarket accessory to meet federal motor vehicle safety standards (like FMVSS).

SUMMARY

Generally, the present disclosure provides an exterior rear view assembly having an integrated mounting attachment for the vehicle cowl. Moving the rearview device to an integration with the vehicle cowl allows removal of the vehicle door and, in addition, desired styling and/or vehicle theme. Further, the present disclosure exterior rear view mirror assembly may provide accessory mounting connector points.

In detail, the present disclosure provides an exterior rear view assembly for mounting to a vehicle with a cowl, comprising: a base assembly adapted for attachment to the vehicle independent of whether the vehicle is provided with a vehicle door, wherein the base assembly is adapted for attachment to the cowl; and a head assembly coupled to the base assembly.

One embodiment can be further characterized in that the base assembly comprises a base frame and a base cover, with the base frame comprising a base frame upper and a base frame lower, and/or with the base cover comprising an upper cover and a lower cover.

The base frame upper may be adapted for attachment to the cowl, and/or the upper cover may be adapted for attachment to the cowl, in particular via at least on clip, snap and/or latch connection and/or an overlap joint.

The present disclosure further proposes that the base frame upper is provided with a first end for attachment with the cowl and/or a support area, in particular in form of a shoulder, for a secondary mounting location of the cowl, and/or the base frame upper connects to the base frame lower, in particular by providing at least one mounting element with a corresponding geometry to an upper end of the base frame lower.

The base frame lower may be provided for amounting the base frame upper, the head assembly, an accessory and/or a harness.

It is proposed that the accessory comprises a least one illumination device, at least one camera, at least one camera monitoring system, at least one sensor, at least one actuator, at least one heating system, at least one cooling system, at least one cleaning system for a camera and/or a windshield and/or an aftermarket accessory bracket.

In addition, it is proposed that the harness comprises at least one electrical cable to provide electrical power to one or more first modules, in particular comprising the accessory, a power-fold actuator, a telescoping actuator, a mirror adjustment actuator, an electrochromic mirror, and/or the harness comprises at least one fluid conduit for supplying a fluid to one or more second modules, in particular comprising the accessory, the at least one cooling system, the at least one cleaning system and/or the at least one cooling system Embodiments of the exterior rear view assembly can be further characterized in that the base frame comprises at least one connector point, preferably accessible through at least one aperture in the base frame cover, in particular the upper cover, and/or the cowl.

In this respect it is also proposed that the base frame upper provides the or each connector point, and/or the or each connector point is adapted for mounting an accessory.

Further exterior rear view assemblies according to the present disclosure may comprise a pivot joint between the base frame and the head assembly, and/or at least one mirror element provided by the head assembly.

The present disclosure also provides a vehicle with a cowl and at least one exterior rear view assembly of the present disclosure.

It is also disclosed that the cowl is assembled after the base frame upper is mounted to a base frame lower, and/or the cowl is a distinct part from the upper cover, or the cowl and the upper cover are combined to be a single integral part, and/or the cowl cooperates with the exterior rear view assembly to form a continuous cover appearance between the upper cover and the cowl.

Still further, it is proposed that the base frame lower is attached to an A-pillar, an A-pillar reinforcement, a cowl sheet metal upper, a cowl sheet metal lower and/or a hinge pillar.

A vehicle according to the present disclosure can be further described in that the upper cover and/or the cowl is/are adapted to mount at least one accessory, in particular by providing at least one aperture.

The vehicle of the present disclosure may further comprise at least one door, a hood and/or a side panel.

It should be noted that the features set out individually in the following description may be combined with each other in any technically advantageous manner and set out other forms of the present disclosure. The description further characterizes and specifies the present disclosure in particular in connection with the Figures.

DRAWINGS

In order that the disclosure may be well understood, there will now be described various forms thereof, given by way of example, reference being made to the accompanying drawings, in which.

DETAILED DESCRIPTION

Figure 1:
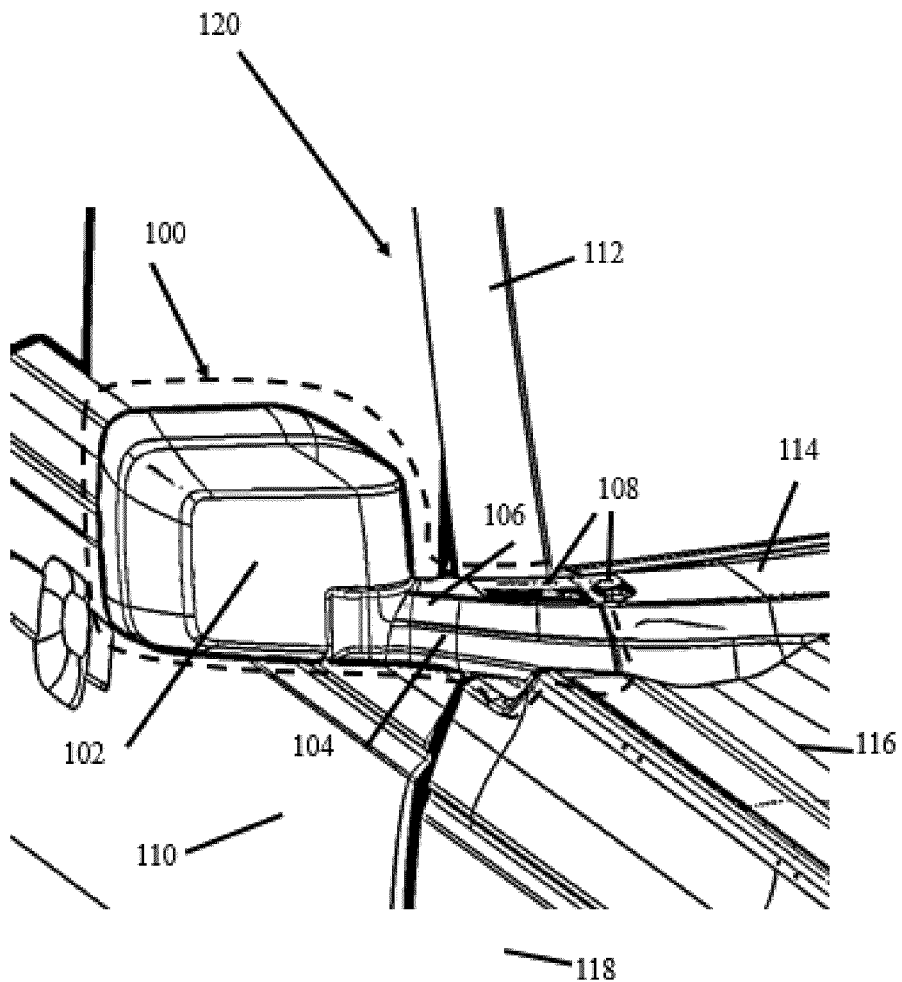
FIG. 1 is a front isometric, assembled view of a mounted exterior mirror according to the teachings of the present disclosure.

The following description is merely exemplary in nature and is not intended to limit the present disclosure, application, or uses. It should be understood that throughout the drawings, corresponding reference numerals indicate like or corresponding parts and features.

Figure 2:
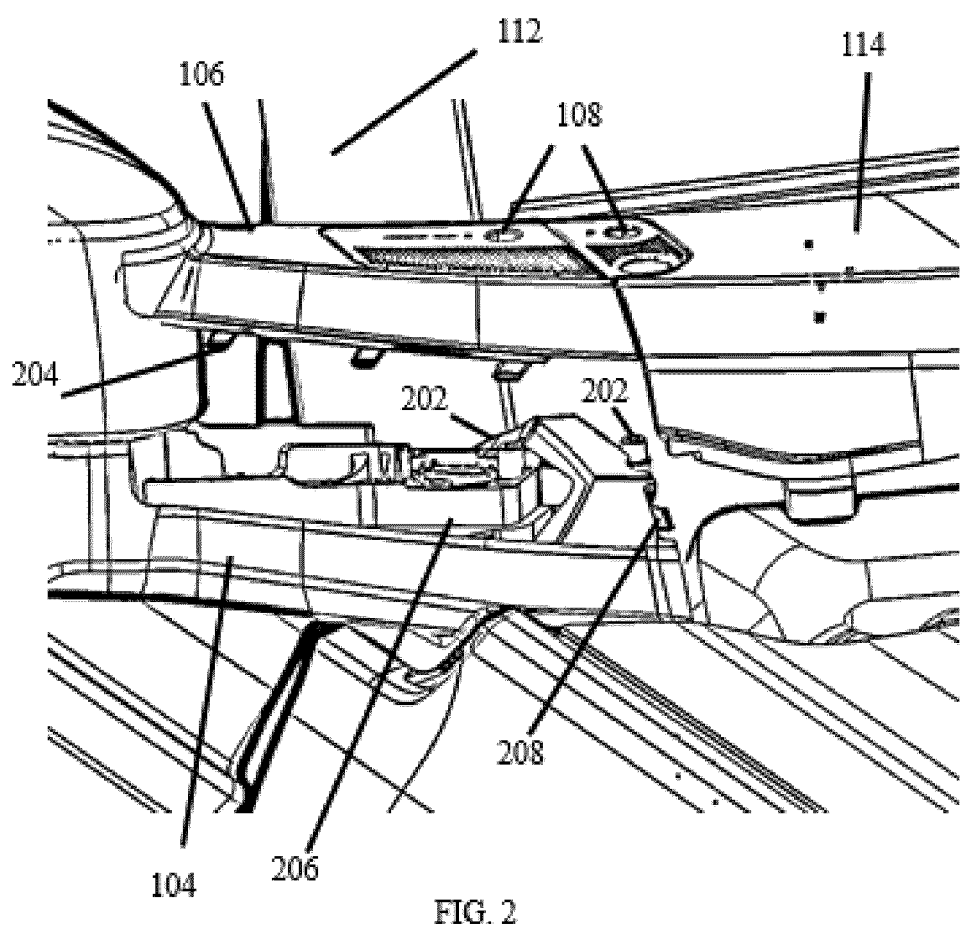
FIG. 2 is a front isometric, exploded view of the mounted exterior mirror according to the teachings of the present disclosure.

As shown in FIG. 1, an exterior rearview mirror assembly 100 is shown to be mounted on a vehicle 120 as a vehicle mirror assembly. The vehicle 120 includes an A-pillar 112, a door 110, a hood 116, a cowl 114 and a side panel 118. The exterior mirror assembly 100 shown by the dotted line includes a mirror head 102, an upper cover 106 and a lower cover 104. FIG. 2 illustrates an exploded view of the upper cover 106 and the cowl 114. The upper cover 106 and the lower cover 104 act as the exterior covering for a base frame upper 206.

The exterior mirror assembly 100 may provide at least one aperture 108 for access to a mounting point for various, not shown vehicle accessories such as a spotlight, position light, a camera, a camera monitoring system, at least one sensor such as radar, LIDAR or ultrasonic, a cleaning system for the camera, a windshield, or an aftermarket accessory bracket. The at least one aperture 108 may also be integrated into the cowl 114. The at least one aperture 108 integrated in the cowl 114 may work independently or in cooperation with the at least one aperture 108 of the mirror assembly 100 to mount a vehicle accessory. It is within the scope of this disclosure to have a cowl mounted mirror assembly with no aperture 108 for exterior mounting of accessories. In FIG. 1, the cowl 114 is a distinct part from the upper cover 106. The cowl 114 in FIG. 2 is functionally attached to the upper cover 106. In other variations, the cowl 114 and the upper cover 106 may be combined to be a single integral part and function within the scope of this disclosure.

A tool (not shown) can be inserted into the or each aperture 108 for dissembling for example the cover part 106 by detaching a clip, snap and/or latch connection. The tool can also be used to attach, tighten, release, untighten and the like of any accessory. For that purpose, the tool may be in form of a screw driver, a battery drill or the like.

A base frame upper 206 is provided with at least one mounting connector point 202 which is accessible through the at least one apertures 108, see FIG. 2. The lower cover 104 is attached to base frame upper 206 by the use of known fastener systems such as clips or screws when attaching the lower cover 104 to the base frame upper 206. The upper cover 106 attaches to the lower cover 104 with at least one clip 204. Known fastener systems in the art could also replace the at least one clip 204 in attaching the upper cover 106 to the lower cover 104. The upper cover 106 may also be fastened to the base frame upper 206 to provide additional restraint for the upper cover 106.

The lower cover 104 and the upper cover 106 may be made of a suitable polymer such as ABS plastic. The upper and lower covers 104, 106 cooperate to form a class A surface enclosing the base frame upper 206 when assembled. The upper and lower covers 104, 106 and the mirror head 102 may also be coated with a protective layer and/or a decorative layer such as chrome or paint.

Figure 3:
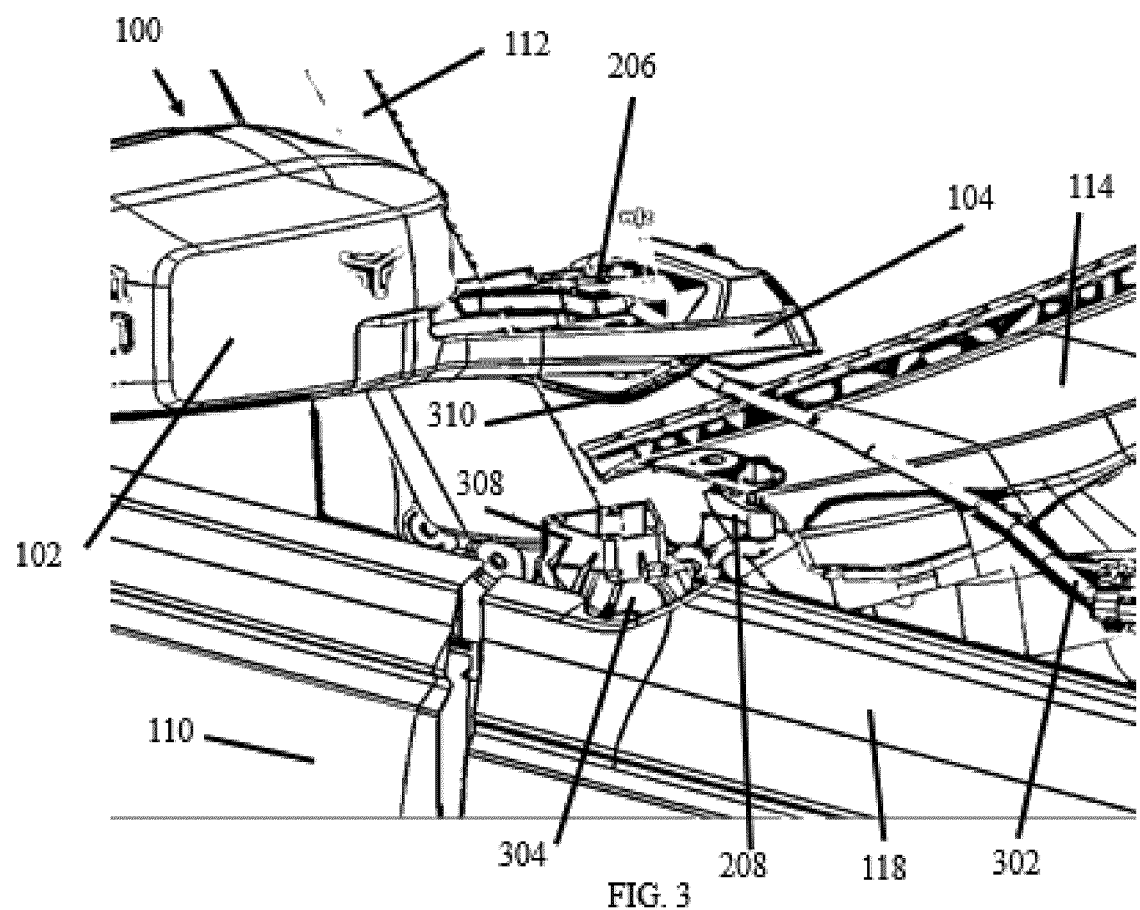
FIG. 3 is an isometric, exploded view of the exterior mirror assembly according to the teachings of the present disclosure.

The functional attachment of the cowl 114 to the upper cover 106 in line with FIG. 2 may be a structural connection such as a clip or just an overlap joint between the cowl 114 and the upper cover 106. In one form, the cowl 114 engages with a base frame upper first end 208, as best seen in FIG. 3) This engagement may be a structural attachment for mounting the cowl 114 such as a clip, or other fastener system known to one skilled in the art. The cowl 114 may also include a secondary mounting location to the base frame upper first end (not shown). The base frame upper 206 may also provide a support area to the cowl 114 such as a shoulder area to improve stability, reduce vibration, and assist assembly for the cowl 114 when the cowl 114 is assembled. In the form of FIG. 3, the cowl 114 is assembled after the base frame upper 206 is mounted to a base frame lower 304. The cowl 114 cooperates with the mirror assembly 100 to form a continuous cover appearance between the upper cover 106 and the cowl 114.

In detail, FIG. 3 illustrates an isometric, exploded view of a mounting of the cowl mounted exterior mirror. The base frame lower 304 is provided for mounting the base frame upper 206 and the mirror assembly 100. The base frame lower 304 is configured for engage the base frame upper 206. The base frame lower 304 may also be configured to mount the cowl 114 and any accessories such as a camera, spotlight or tie down straps. The base frame upper 206 connects to an upper end 308 of the base frame lower 304. The base frame upper 206 contains a mounting element 310 with a corresponding geometry to the upper end 308 of the base frame lower. In this form, a corresponding geometry of the mounting element 310 couples with a geometry at the upper end 308 of the base frame lower. Known fasteners by one skilled in the art such as screws, clips or bolts may be used attach the base frame upper 206 to the base frame lower 304. In another form, the coupling between the base frame upper 206 and the base frame lower 304 could be a locking configuration between the matching geometries of the base frame lower 304 and the base frame upper 206.

A wiring harness 302 is routed through the base frame upper 206 to the mirror head 102, as shown in FIG. 3. The wiring harness 302 provides electrical power for the mirror assembly 100. The mirror assembly 100 may include modules requiring electrical power such as a camera, a sensor, a power-fold actuator, a telescoping actuator, a mirror adjustment actuator, at least one illumination device 406 shown in FIG. 4 and FIG. 5, a blind spot indicator, an electrochromic mirror assembly, and/or a heating and/or cooling system for the camera and/or mirror. The wiring harness 302 may also include a conduit for supplying a fluid to the mirror assembly 100 for cleaning of a camera or at least one mirror element 602 as indicated in FIG. 6.

Figure 4:
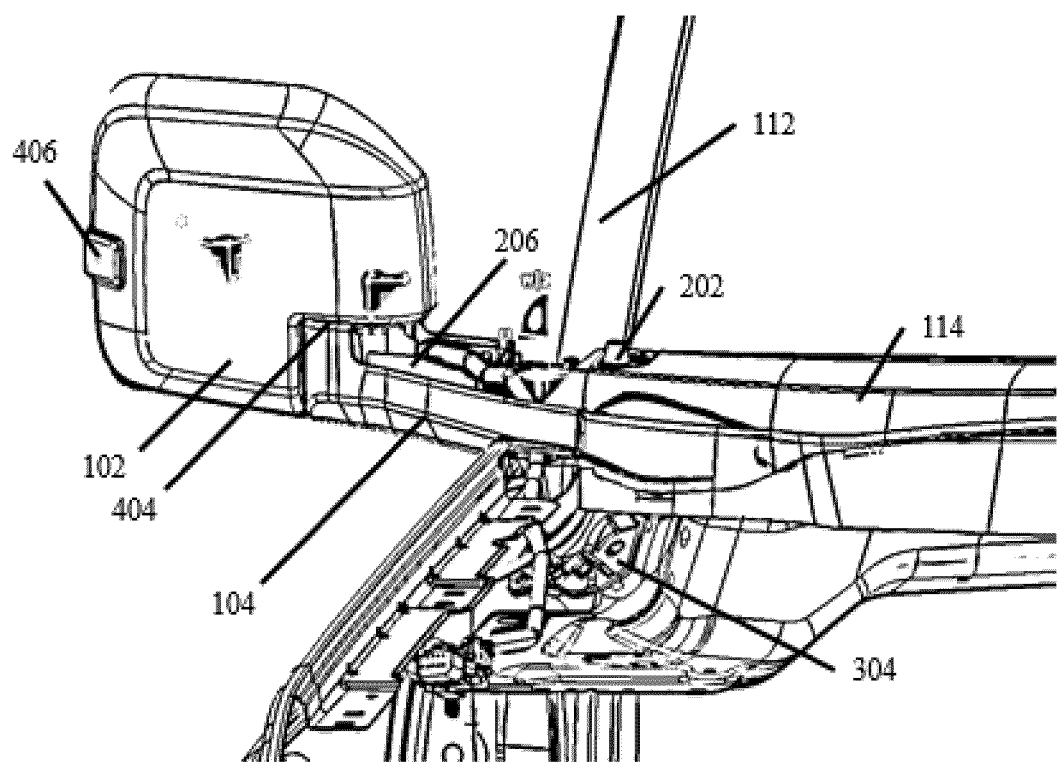
FIG. 4 is a front isometric, partially assembled view of the exterior mirror according to the teachings of the present disclosure.
Figure 5:
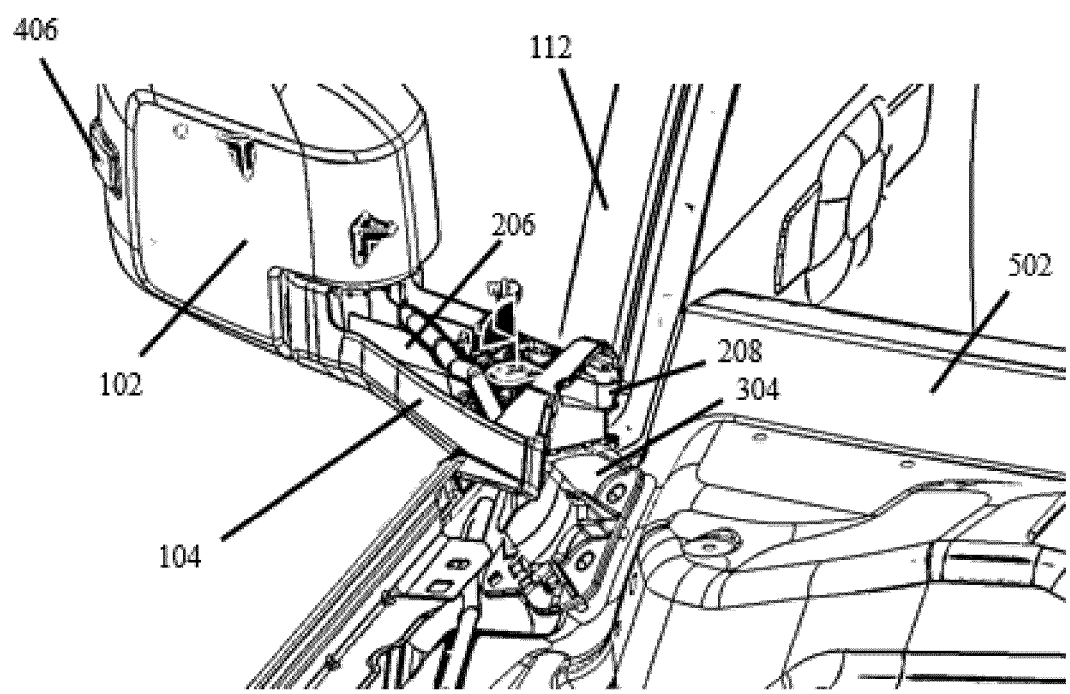
FIG. 5 is an isometric, partially assembled view of the exterior mirror according to the teachings of the present disclosure.
Figure 6:
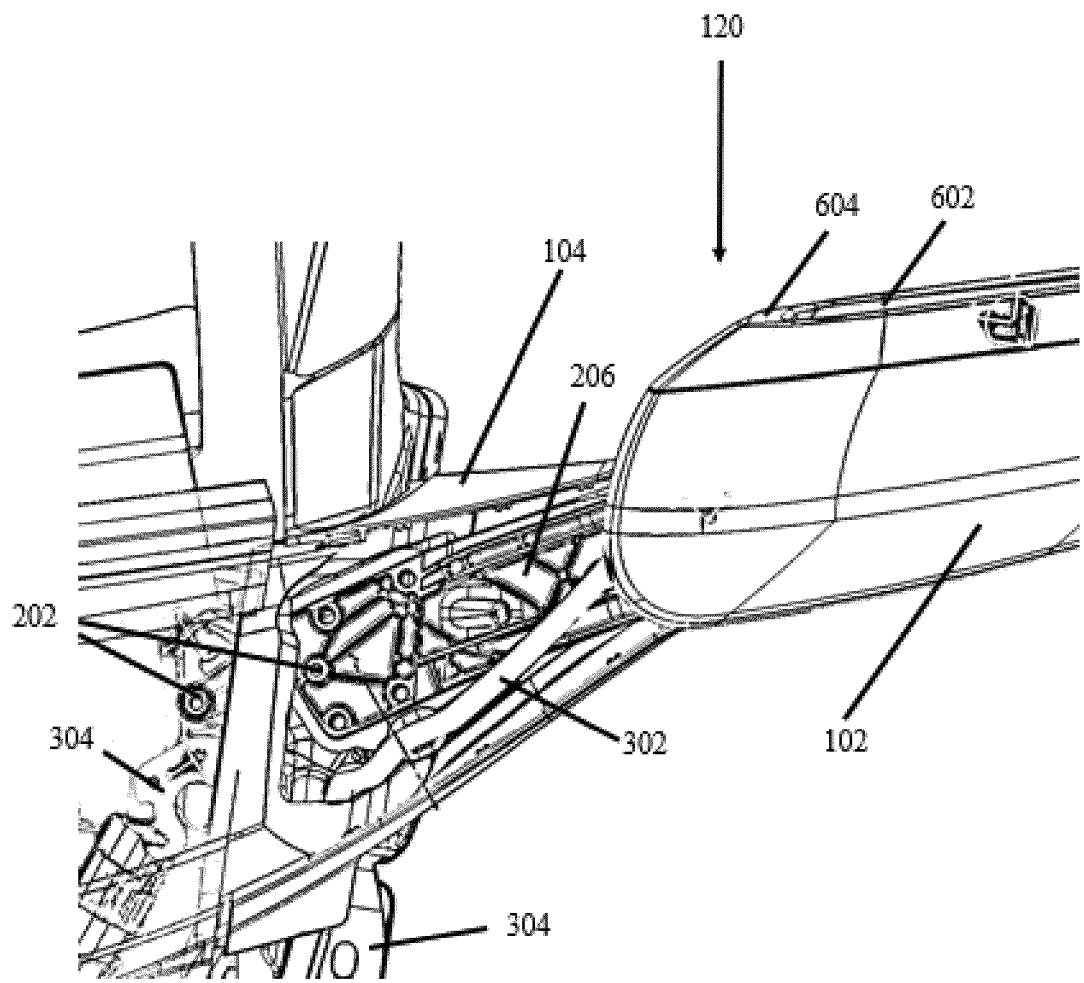
FIG. 6 is a top isometric, partially assembled view of the exterior mirror according to the teachings of the present disclosure.
Figure 7:
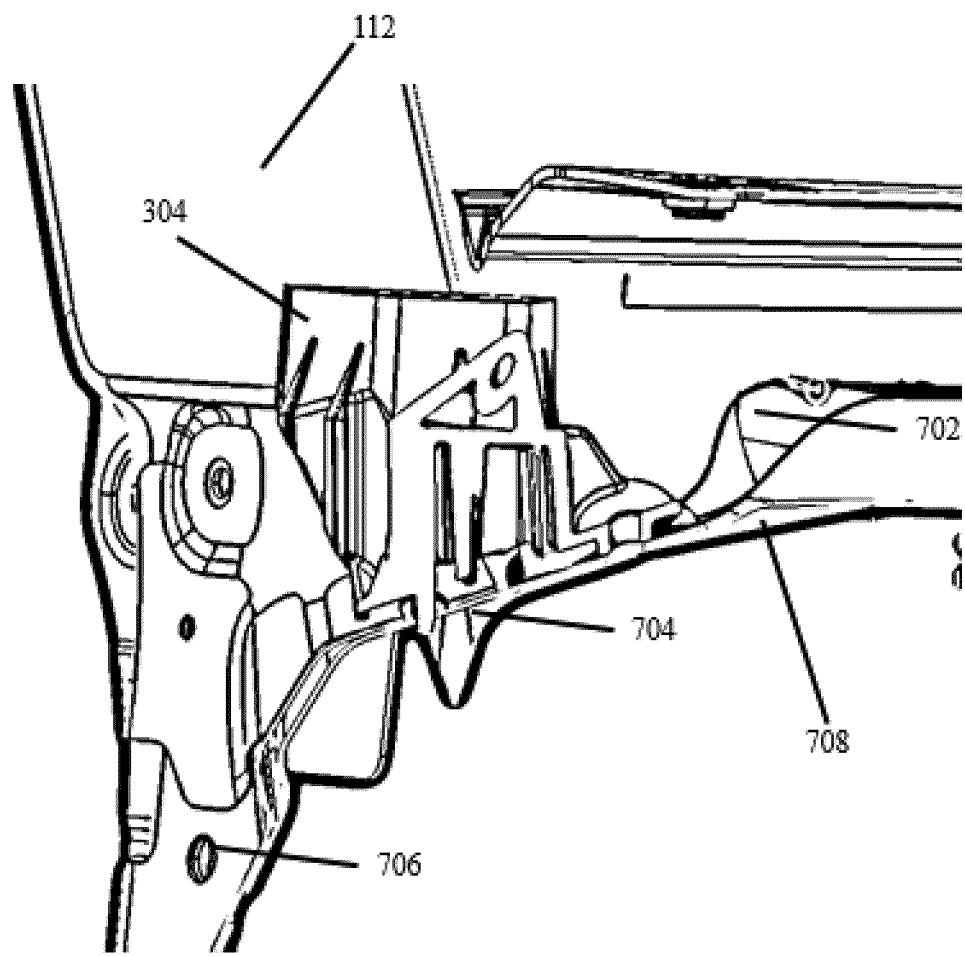
FIG. 7 is an isometric assembly view of the mounting of the base frame lower according to the teachings of the present disclosure.

FIG. 4 and FIG. 5 illustrate one example of the mounting of the base frame lower 304 to the A-pillar 112, and the base frame lower 304 may also be mounted to a hinge pillar 706 in line with FIG. 7 and to a cowl sheet metal 502 in line with FIG. 5. The mounting of the base frame lower 304 to any combination of the A-pillar, hinge pillar, and cowl sheet metal lies within the scope of this disclosure. The base frame upper 206 and the base frame lower 304 could also be combined into a single base frame or provide rotational capability between the base frame upper 206 and the base frame lower 304 for mounting the mirror assembly 100.

The mirror assembly 100 includes the at least one illumination device 406 shown in FIG. 4 and FIG. 5. The at least one illumination device 406 could be an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof. The at least one illumination device 406 can be a combination of the functions above in a single device or may be multiple illumination devices having their own function. The at least one illumination device 406 is shown on the mirror head 102 in FIG. 4 and FIG. 5. The at least one illumination device 406 may be located in any area of the mirror assembly 100 such as incorporated in a bezel 604 shown in FIG. 6, integrated in the base frame upper 206, the upper cover 106, the lower cover 104 without departing from the scope of this disclosure. The at least one illumination device 406 may also be integrated in the mirror head 102 for use behind the at least one mirror element 602 shown in FIG. 6 as a warning indicator or to be displayed through a coating such as a partially transparent chromium or chromium based coating. An example of a partially transparent chromium based coating for polymeric substrates such as the mirror head 102 is described in US 2016/0059773, filed on Nov. 9, 2015 for COATED POLYMERIC SUBSTRATES and in US 2017/0015802, filed on Feb. 20, 2015 for DECORATIVE COATINGS FOR PLASTIC SUBSTRATES, which are all hereby incorporated herein by reference.

The mirror head 102 has a rotational attachment at a pivot joint 404 with the base frame upper 206 and lower cover 104, see FIG. 4. This rotational attachment allows the mirror head 102 to rotate in relation to the vehicle 120 and to the cowl 114 with at least one defined pivot position. The rotation of the mirror head 102 about the pivot joint 404 may be achieved manually or with the use of a power-fold actuator (not shown). One example of a rear view element folding device for a motor vehicle for approaching at least one pivot position of an element housing relative to an element foot that can be mounted on the motor vehicle, and for locking or unlocking at least one resting position of the element housing relative to the element foot as well as a method for triggering such a rear view element folding device are disclosed in US 2017/0136951A1, filed on Nov. 11, 2016 for REAR VIEW ELEMENT FOLDING DEVICE and EP 3 168 468, filed on Nov. 4, 2016 for RÜCKBLICK-ELEMENT-KLAPPVORRICHTUNG, both claiming priority to DE 20 2015 106 118.8 filed on Nov. 12, 2015, which are all hereby incorporated herein by reference.

FIG. 6 illustrates a top view of the exterior mirror assembly 100. The at least one connector point 202 is shown in the base frame upper 206. The or rather each connector point 202 can be used for mounting integral original manufacturer supplied accessories or aftermarket accessories to the base frame upper 206. The connector point 202 is accessible through the at least one aperture 108 in the upper cover 106 and the cowl 114. The at least one mirror element 602 may include a secondary reflective surface known as a spotter mirror (not shown). The spotter mirror consists of an integrated spherical convex blind zone mirror inset within a larger planar mirror. The at least one mirror element 602 may also be or comprise a camera viewing assembly for capturing and displaying images to a driver. The at least one mirror element 602 may also be an electrochromic mirror. The electrochromic mirror may be controlled by glare sensors in the mirror or elsewhere on the vehicle. The electrochromic mirror may operate in tandem with other electrochromic mirrors in the vehicle or independently.

In FIG. 7, the mounting of the base frame lower 304 is further illustrated. The base frame lower 304 is attached to an A-pillar reinforcement 704. In this form, the mounted bracket is also fastened to the A-pillar 112, a cowl sheet metal upper 702, a cowl sheet metal lower 708, and the hinge pillar 706. The base frame lower 304 is attached to the vehicle independent of the door 110. This allows for the vehicle door 110 to be removed while the mirror assembly 100 remains attached to the vehicle.

The advantages of the rear view assembly of the present disclosure in particular are as follows:
  The rear view assembly can be mounted independent of the vehicle door so that when the doors are removed the rear view assembly is still attached to the vehicle.
  The upper cover of the rear view assembly cooperates with the cowl of the vehicle to form a seamless design.
  The upper cover and/or the cowl has/have the ability to mount accessories.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the disclosure in the foregoing description, in the drawings and in the claims can be essential both individually and in any combination for the implementation of the disclosure in its various embodiments.

REFERENCE SIGNS

100—Mirror assembly
102—Mirror head
104—Lower cover
106—Upper cover
108—Aperture
110—Door
112—A-pillar
114—Cowl
116—Hood
118—Side panel
120—Vehicle
202—Connector point
204—Clip
206—Base frame upper
208—Frame first end
302—Wiring harness
304—Base frame lower
308—Upper End
310—Mounting element
404—Pivot joint
406—Illumination device
502—Cowl Sheet metal
602—Mirror Element
604—Bezel
702—Cowl sheet metal upper
704—A-pillar reinforcement
706—Hinge pillar
708—Cowl Sheet metal lower

The invention claimed is:

1. An exterior rear view assembly for mounting to a vehicle with a cowl, comprising:
    a base assembly adapted for attachment to the vehicle independent of whether the vehicle is provided with a vehicle door, wherein the base assembly is adapted for attachment to the cowl; and
    a head assembly coupled to the base assembly,
    wherein the base assembly comprises a base frame and a base cover, with the base frame comprising a base frame upper and a base frame lower, and with the base cover comprising an upper cover and a lower cover.

2. The exterior rear view assembly according to claim 1, wherein
    the base frame upper is adapted for attachment to the cowl, and
    the upper cover is adapted for attachment to the cowl via at least one clip, snap or latch connection or an overlap joint.

3. The exterior rear view assembly according to claim 1, wherein at least one of:
    the base frame upper is provided with a first end for attachment with the cowl and/or a support area for a secondary mounting location of the cowl, and
    the base frame upper connects to the base frame lower, by providing at least one mounting element with a corresponding geometry to an upper end of the base frame lower.

4. The exterior rear view assembly according to claim 1, wherein
    the base frame lower is provided for mounting the base frame upper, the head assembly, at least one accessory and/or a harness.

5. The exterior rear view assembly according to claim 4, wherein the accessory comprises at least one illumination device.

6. The exterior rear view assembly according to claim 4, wherein at least one of:
    the harness comprises at least one electrical cable to provide electrical power, or
    the harness comprises at least one fluid conduit for supplying a fluid.

7. The exterior rear view assembly according to claim 1, wherein
    the base frame comprises at least one connector point, accessible through at least one aperture in the base cover or the cowl.

8. An exterior rear view assembly for mounting to a vehicle with a cowl, comprising:
    a base assembly adapted for attachment to the vehicle independent of whether the vehicle is provided with a vehicle door, wherein the base assembly is adapted for attachment to the cowl; and
    a head assembly coupled to the base assembly,
    wherein the base assembly comprises a base frame and a base cover, and wherein the base frame comprising a base frame upper and a base frame lower,
    wherein the base frame comprises at least one connector point, accessible through at least one aperture in the base cover or the cowl, and
    wherein the base frame upper provides the at least one connector point, and the at least one connector point is adapted for mounting an accessory.

9. The exterior rear view assembly according to claim 1, further comprising
    a pivot joint between the base frame and the head assembly, and
    at least one mirror element provided by the head assembly.

10. A vehicle with a cowl and at least one exterior rear view assembly according to claim 1.

11. The vehicle according to claim 10, wherein at least one of:
    the cowl is assembled after the base frame upper is mounted to a base frame lower, or
    the cowl is a distinct part from the upper cover, or
    the cowl cooperates with the exterior rear view assembly to form a continuous cover appearance between the upper cover and the cowl.

12. The vehicle according to claim 10, wherein
    the base frame lower is attached to an A-pillar, an A-pillar reinforcement, a cowl sheet metal upper, a cowl sheet metal lower or a hinge pillar.

13. The vehicle according to claim 9, wherein
    the upper cover or the cowl is adapted to mount the at least one accessory by providing at least one aperture.

14. The vehicle according to claim 9, further comprising at least one door, a hood and a side panel.

* * * * *